United States Patent
Binder et al.

(10) Patent No.: US 11,109,101 B1
(45) Date of Patent: Aug. 31, 2021

(54) APPARATUS, SYSTEM, AND METHOD FOR ABR SEGMENT PULL DVR

(71) Applicant: LAYER3 TV, INC., Denver, CO (US)

(72) Inventors: Jeffrey Binder, Denver, CO (US); Charles A. Hasek, Denver, CO (US)

(73) Assignee: T-MOBILE USA, INC., Bellevue, WA (US)

( * ) Notice: Subject to any disclaimer, the term of this patent is extended or adjusted under 35 U.S.C. 154(b) by 505 days.

(21) Appl. No.: 15/154,925

(22) Filed: May 13, 2016

Related U.S. Application Data

(60) Provisional application No. 62/161,197, filed on May 13, 2015.

(51) Int. Cl.
  *H04N 21/458* (2011.01)
  *H04N 21/4147* (2011.01)
  *H04N 21/433* (2011.01)

(52) U.S. Cl.
  CPC ....... *H04N 21/458* (2013.01); *H04N 21/4147* (2013.01); *H04N 21/4334* (2013.01)

(58) Field of Classification Search
  None
  See application file for complete search history.

(56) References Cited

U.S. PATENT DOCUMENTS

| | | | | |
|---|---|---|---|---|
| 7,240,099 B2* | 7/2007 | Miyazaki | ............... | H04L 47/10 709/203 |
| 8,924,580 B2* | 12/2014 | Begen | ................... | H04N 19/46 709/219 |
| 2006/0051059 A1* | 3/2006 | Krakirian | ............... | H04N 5/782 386/293 |
| 2012/0004960 A1* | 1/2012 | Ma | ..................... | G06Q 30/0241 705/14.4 |
| 2013/0060911 A1* | 3/2013 | Nagaraj | ......... | H04N 21/234327 709/219 |
| 2013/0067052 A1* | 3/2013 | Reynolds | ................ | H04L 67/02 709/223 |
| 2013/0129317 A1* | 5/2013 | Moorer | ............ | H04N 21/23424 386/241 |
| 2013/0179590 A1* | 7/2013 | McCarthy | .......... | H04N 21/8456 709/231 |
| 2013/0232228 A1* | 9/2013 | Ramamurthy | .......... | H04L 65/80 709/219 |
| 2014/0280781 A1* | 9/2014 | Gregotski | ............... | H04L 65/60 709/219 |
| 2014/0282771 A1* | 9/2014 | Tumuluru | .......... | H04N 21/2662 725/95 |
| 2015/0149589 A1* | 5/2015 | Hao | ....................... | H04W 8/22 709/219 |
| 2016/0050246 A1* | 2/2016 | Liao | ..................... | H04L 5/0085 709/219 |
| 2016/0088054 A1* | 3/2016 | Hassan | ................... | H04L 65/80 709/219 |
| 2016/0119404 A1* | 4/2016 | Bowen | ............... | G06Q 10/0631 709/217 |
| 2016/0295245 A1* | 10/2016 | Slssingar | ........... | H04N 21/6131 |
| 2016/0315991 A1* | 10/2016 | Oh | ........................ | H04N 21/236 |
| 2017/0055012 A1* | 2/2017 | Phillips | ................... | H04L 67/06 |

* cited by examiner

*Primary Examiner* — Hung Q Dang
(74) *Attorney, Agent, or Firm* — Brownstein Hyatt Farber Schreck, LLP

(57) ABSTRACT

A digital video recorder apparatus, system and method for recording programming material and removing limitations of a storage medium by pulling adaptive bt rate segments from a content delivery network.

20 Claims, 2 Drawing Sheets

APPARATUS, SYSTEM, AND METHOD FOR ABR SEGMENT PULL DVR

CROSS-REFERENCE TO RELATED APPLICATION

This application is a nonprovisional patent application of and claims the benefit of U.S. Provisional Patent Application No. 62/161,197, filed May 13, 2015 and titled Apparatus, System, and Method for ABR Segment Pull DVR," the disclosure of which is hereby incorporated herein by reference in its entirety.

FIELD OF THE INVENTION

The present invention relates to digital video recorders and, more particularly, to an apparatus system and method for pulling of media content segments for DVR functions in an adaptive bit rate content delivery network (CDN).

BACKGROUND OF THE INVENTION

Conventional Digital video recording device have allowed for the real time capture, storage, and display of television broadcast signals. Conventional DVR functions to capture linear broadcast content and form continuous streams of formatted digital data such as, for example, a video segment, audio segment, or information segment stream. For example, such a DVR system and method was created by TiVo configured to operate and convert broadcast non-linear content to MPEG files for later playback by a subscriber or user of the system.

For example, U.S. Pat. No. 6,327,418 B1 entitled "Method And Apparatus Implementing Random Access And Time-Based Functions On A Continuous Stream Of Formatted Digital Data" describes a digital video recording system and method that moves away from the mechanical recording of conventional systems, e.g. VCR, tape, etc. The '418 patent also provides special effect functions in the recorded stream, such as, Pause, Rewind, Fast-forward, and Play, as well as more sophisticated and unique operations, such as, Play-Faster, Play-Slower, and Play-in-Reverse.

These systems and methods were an improvement over mechanical systems that recorded video content for later playback by the user; however, these systems require operating on the stream or "streaming" technology e.g. providing frames captured from the pass-through continuous linear streams of digital information represented in various formats with the appearance of a locally stored stream. While conventional DVR systems and methods may provide special effects, such conventional DVR systems and methods use a large amount of system resources and across the content network. It would be advantageous to overcome these disadvantages and to accomplish playback to the user in a more efficient manner that utilizes less bandwidth and other CDN resources in an ABR configuration.

In an effort to reduce the overhead and usage of system resources in the DVR function, some conventional systems convert TV streams to an Moving Pictures Experts Group (MPEG) formatted stream for internal transfer and manipulation and are parsed and separated it into video and audio components for streaming to the subscriber, for example, as suggested in U.S. Pat. No. 7,529,465 B2 entitled "System For Time Shifting Multimedia Content Streams". This streaming technology has the ability to simultaneously record and play-back TV broadcast programs and to essentially decouple the microprocessor from the high video data rates of the broadcast stream, thereby reducing the microprocessor and system requirements of the device. However, while the system may operate to store the MPEG streams in a MPEG contiguous file related to the recorded programming, the system requires "streaming" for playback and other special effects, e.g. play-back and to perform special effects on the stream, e.g. fast forward, reverse, play, pause, fast/slow play, indexing, and fast/slow reverse play. While such conventional streaming technology has been used to accomplish such special effects, the usage of system resources remains still high in such systems and methods of the prior art. It would be advantageous to overcome these disadvantages and to accomplish playback to the user in a more efficient manner.

Conventional DVR systems and methods also have suggested managing the streams stored on the storage medium as a way of efficient use of system resources. Known streaming digital recording systems and methods for managing the storage medium are disclosed, for example, in U.S. Patent Publication No. 2002/0118954A1 entitled "Data Storage Management And Scheduling System." The publication discloses a system and method for managing the available free space on the storage medium such that the available free space is used efficiently. This TiVo system seeks to efficiently manage the input of streaming source data across a storage medium. Such system was developed to manage storage of streamed signals of a defined format for video programs in device storage and other memory demands that the program material places on the user's device in the management of user recordings of desired program material.

While such systems and methods have been used to manage device and system resources for streamed signals of a defined format video program on the user device storage medium, these conventional systems and methods have limited capabilities and may be overwhelmed for large quantities of information and user requests to store multiple program material. It would be advantageous to overcome these disadvantages and to accomplish playback to the user in a more efficient manner.

SUMMARY OF THE INVENTION

It is an object of the present invention to provide a DVR apparatus, system and method for recording of programming material that removes limitations of the storage medium that occurred in the prior art by pulling ABR segments from the CDN.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein.

DESCRIPTION OF THE EMBODIMENTS

Figure 1:
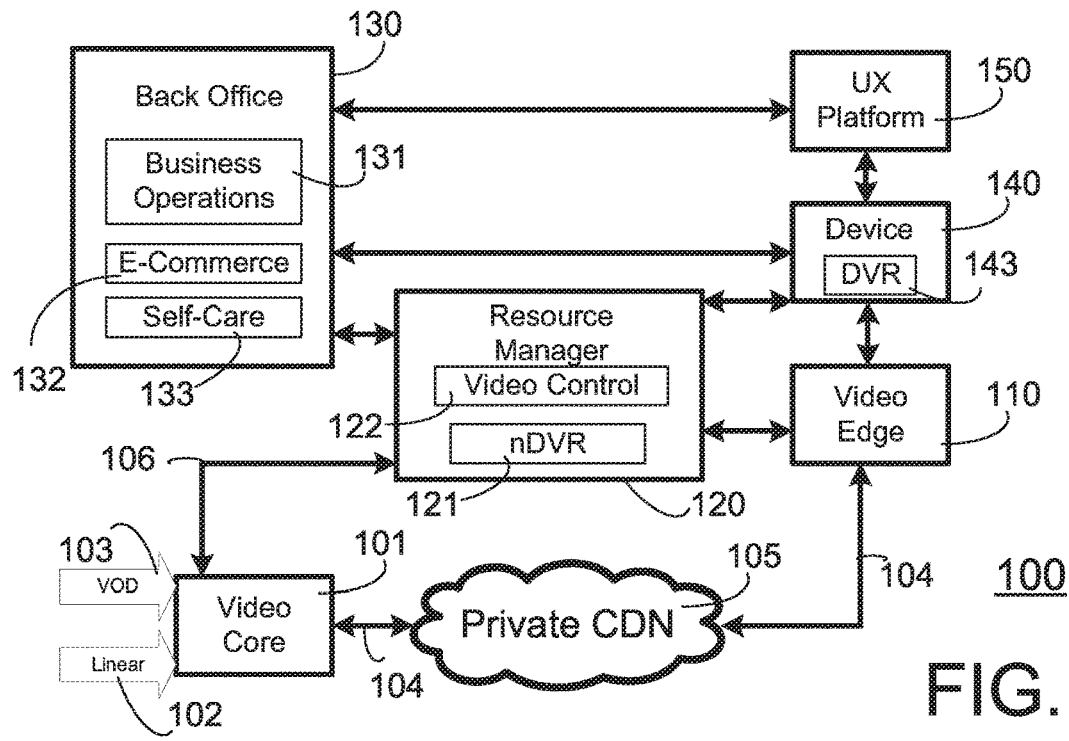
FIG. 1 illustrates is a block schematic diagram of an adaptive bit rate (ABR) Content Delivery Network (CDN) device, system and method accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "DVR" refers to a device or application software that digitally compressing analog and/or video feeds and storing these feeds in memory (i.e. that records video in a digital format to a hard-drive, system memory, a disk drive, USB flash drive, SD memory card, SSD or other local or networked mass storage device, etc.). The term includes set-top boxes (STB) with direct to disk recording facility, portable media players (PMP) with recording, recorders (PMR) as camcorders that record onto Secure Digital memory cards and software for personal computers which enables video capture and playback to and from a hard disk drive. The term "digital" referring to the compression and storage technology, not the transmitted video images.

As used herein the term "network digital video recording" or "nDVR" refers to a device or application software that stores digital images or video on the network "in the cloud" (e.g. directly from the IP-network into a networked mass storage device). As used herein the term "Quality of Services" or "QoS" refers to a device or application software device is one that is capable, in order to comply with bandwidth limitations of a network, of limiting the transmission rate it uses for transmission or reception over the network, A QoS device may be capable of negotiating with a system resource manager for varying amounts of bandwidth.

As used herein the term "application programming interface" or "API" refers to a software component in terms of its operations, inputs, outputs, and underlying types is a set of routines, protocols, and tools for building software applications.

The invention is an adaptive bit rate (ABR) segment pulling digital video recorder (DVR) system and method for recording digital content to ensure quality of the user experience is generally designated as numeral 100. According to an embodiment, the ABR segment pulling DVR 100 may be formed and implemented using a digital video recorder (DVR) integrated a devices (e.g. a set-top box) and/or on a network digital video recorder (nDVR). The ABR segment pulling DVR 100 provides a user the ability to backing up and playing recorded program material linear and non-linear content media (e.g. TV broadcast programs, VOD, and digital video). The ABR segment pulling DVR 100 may be implemented in a content delivery network (CDN) system using computers to distribute copies of data placed at various nodes of a network by subscription to the device of a user by pulling ABR segments from storage available on the CDN. According to one embodiment, the content media may be, for example, linear broadcasting and non-linear or VOD content media (e.g. audio and podcast hosting, video delivery, live streaming, flash streaming), downloadable objects (e.g. media files, software, documents), live broadcast linear and database queries. Numerous devices are available for a user to play the content media such as TV, HD-monitors, mobile devices Referring to FIGS. 1 through 3, the ABR segment pulling DVR system and method 100 is adapted for content processing and communication generally comprises a video core 101 for ingesting and packaging linear 102 (e.g. live broadcasting) and non—linear 103 (e.g. video on demand (VOD)) and linear content 103 by communication lines 104 across a communication network 105 to the video edge 110 to service a device 140 (e.g. set-top box, tablet, smart phone, computer, etc.) of a user that subscribes to content subscription service. The video core 101 in the content processing and communication system also communicates with a resource manager 120 over communication lines 106 to provide information about the ingested and packaged linear 102 and non-linear 103 such as, for example, by maintaining a manifest file. The ABR segment pulling DVR 100 also comprising a back office 130 with business operations 131 (e.g. regulations, licenses, etc.), e-commerce 132 (e.g. subscriber billing, payments, etc.) and a self-care 133 portal (e.g. updates, remote servicing of devices, etc.). The user experience platform 150 may be a multi-dimensional platform to present content media to the user in a predetermined graphical user interface (GUI). A digital rights management (DRM) interface 151 that interfaces with the user device 140 and the resource manager 120 operates in the delayed ABR segment pulling DVR 100 to authorize viewing of copyrighted content according to policies and rights management across the CDN 105.

Figure 2:
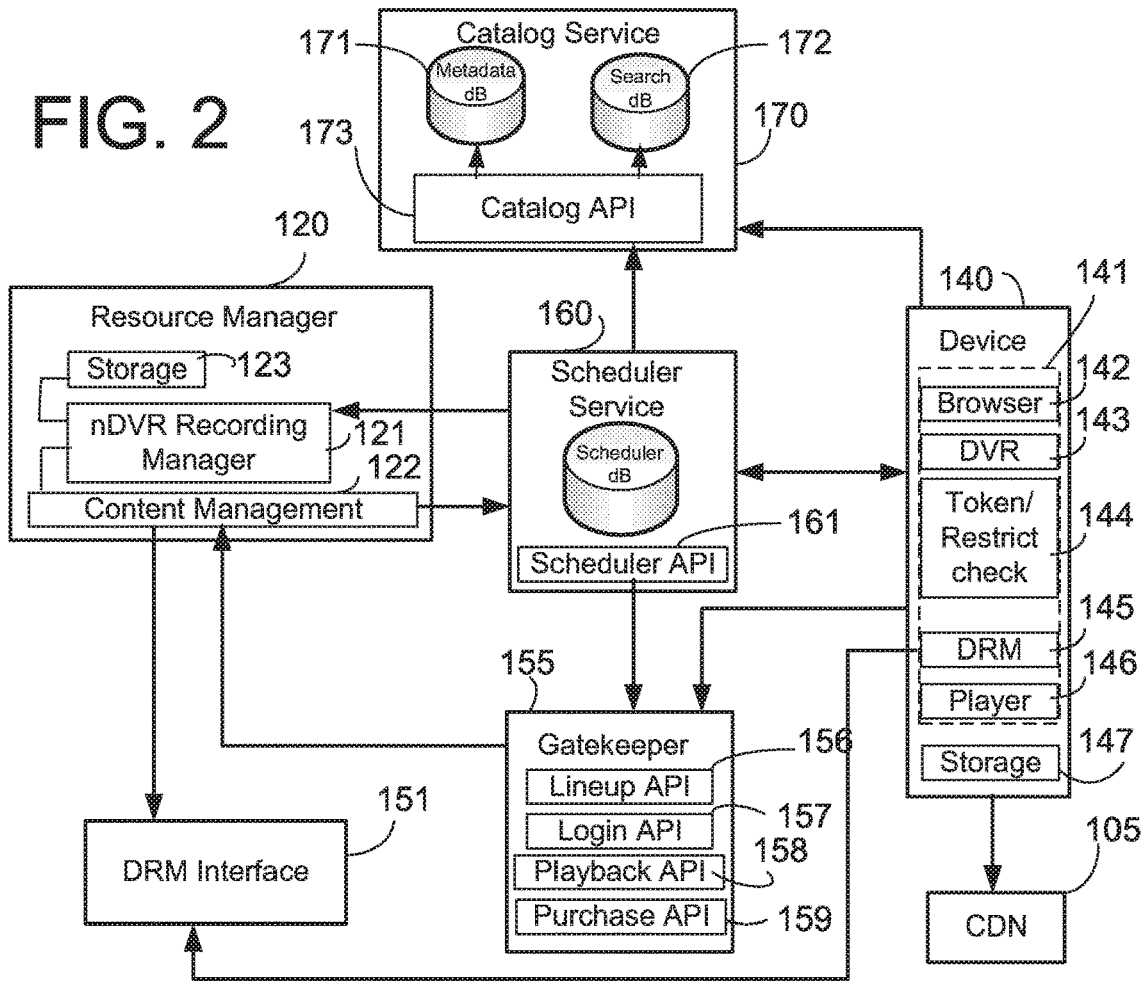
FIG. 2 is a schematic diagram illustrating the digital video recording system and method of recording linear and non-linear media content in accordance with an embodiment of the present invention.

Referring to FIGS. 1 and 2, the resource manager 120 is responsible for allocating, monitoring, and controlling resources, particularly pulling ABR segments and bandwidth therefor, for recording and playback related services. The resource manager 120 may integrate a network DVR (nDVR) 121 for the recording and/or playback of linear 102 and non-linear content 103 by video control 122. According to a DVR embodiment, the device 140 may integrate a DVR recorder 143 for the recording and/or playback of linear 102 and non-linear content 103 in storage on the device. It is to be appreciated that the ABR segment pulling DVR system 100 may provide the nDVR 121 resource in the cloud and DVR 143 on the device 120 for the user.

A preferred embodiment of the invention when recording TV, video and/or movie content media files, the video core 101 ingests non-linear 102 and linear content 103 and packages to encode in, for example, adaptive bit rate (ABR) segments or in one or more multiple bit rate segments and file information (e.g. MPEG formatted segments extracted from the analog and digital TV signal streams, for and storage example, analog forms such as National Television Standards Committee (NTSC) or PAL broadcast, and digital forms such as Digital Satellite System (DSS), Digital Broadcast Services (DBS), or Advanced Television Standards Committee (ATSC). According to an embodiment, the ABR segment pulling DVR system and method 100 may be configured to transfer content media files (e.g. media segments representing frames of video or other programming) by way of Transmission Control Protocol (TCP)/Internet protocol suite (IP). TCP/IP transfer may use a variety of protocols (e.g. HTTP, HTTPS, SMTP, POP3, IMAP, SSH, Telnet, etc.) encapsulated in TCP to transfer and deliver across the CDN 105 network 105 from the video core 104 to the video edge 110 closest to the client device 140.

Figure 3:
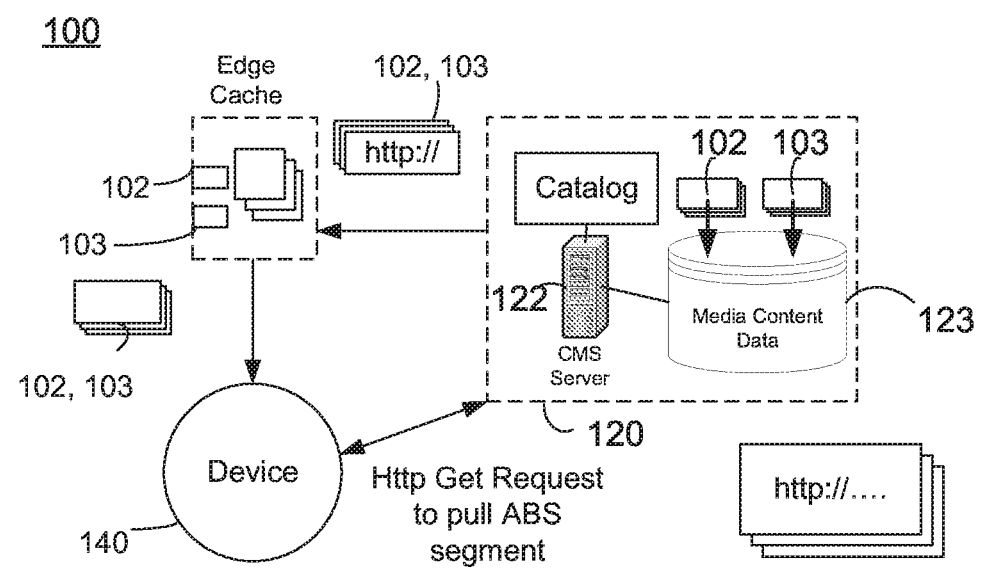
FIG. 3 is a flowchart illustrating the method of recording linear and non-linear media content in accordance with an embodiment of the present invention.

According to an embodiment as is illustrated in FIG. 3, ABR segment pulling DVR system and method 100 can be configured to use ABR technologies to transmit the content media files over HTTP for distribution across the private CDN 105. In this manner, ABR segment pulling DVR system and method 100 uses the advantages of ABR by dynamically monitoring CPU and memory capacity to make corresponding adjustments in the video quality of the transmitted content media by encoding the source linear and non-linear content (e.g. live broadcast, movie, video, etc.) at varying bit rates, and then segmenting each of the different bit rate segments. The media segment length may be a predetermined size and duration, for example, between 2 and 10 seconds. The client or user's device 130 includes a player 146 (as shown in FIGS. 1 and 2) to use the ABR advantageously to switch among the different bit rate segments, thereby locating the segments that correspond best to the bandwidth.

As shown in FIG. 3, the digital recording functionality of the ABR segment pulling DVR system and method 100 may be accomplished by assembling media segments to create a temporal viewing experience (such as time shifting) by reassembling the segments into the original order of the content program being viewed at an alternate time from the original airdate of the program. Any pulled media segments are delivered to the device 140 by resource manager 120 by requests of the device 140 making an active request to retrieve those segments from the network (for instance, using a Content Delivery Network).

The media segments are not multicast or broadcast to the end client, but can only be retrieved by an active request to pull them (for instance, using HTTP GET request) from the network serving device, such as a CDN. The mechanisms may make use of technologies such as adaptive bit-rate (ABR), fragmented MPEG-4 files or other formats that can typically delivered via download technology such as HTTP. Media segments could be delivered in real-time, near real-time or delivery (to account for network blocks, conservation of network resources or other use-cases). Media Segments would typically be video encapsulated in a format used to traverse the network and then made available for playback via a media player, though the segments could encompass other media types such as just audio, images, web hyperlinks, etc. Media Segments would typically consist of a program based on a time boundary, the program may be interspersed with other Media Segments such as for an advertisement, blackout/alternate, content or other customized programming within the program boundary.

Scheduling of the recording of the Media Segments may occur either in the local host or the cloud/server side program scheduler. As shown in FIG. 3, the digital recording functionality of the ABR segment pulling DVR system and method 100 may be utilized advantageously to reduce system overhead in the delivery to the device of the subscriber or user. Moreover, such resources that may be utilized for other functions such as, for example, forming multiple ABR segments of the highest higher resolution on the ingestion of high hit rate video Certain other parts of the system and method 100, as shown in FIGS. 1 and 2, are utilized the ABR segment pull DVR such as the CDN 105 and resource manager 120. The resource manager 120 may be implemented as an API designed as a component that resides on the user device 140 and generally knows resource allocation from all current active ABR pulled segments of the user and status across the CDN 105. The resource manager 120 is utilized for DVR recording and playback for the user experience on the device 140. The resource manager 120 may be configured to determine ABR segment pull configurations based on the bandwidth for the DVR 141 function according to the user device 140. The bandwidth resource usage may be reported by the resource manager 120, for example, a usage report, a global resource configuration, and/or an nDVR 121 related service API in the cloud. The resource manager 120 may be adapted to push notifications to all connected clients (UX platform(s) 150 and DVR(s) 140 with the latest resource statuses. The resource manager 120 is adapted to determine active ABR pulled segments and status changes, or in a sync operation, so as to allow the resource manager 120 to sync all resource statuses with the video edge (i.e. clients) by storing ABR pulled segments content media to the user's device 140 and/or DVR 141.

According to the embodiment for ABR segment pull DVR, the resource manager 120 also is adapted to track and monitor all bandwidth resource usage locally so as to be able to determine if delaying the storage of media content 102, 103 is appropriate or possible according one or more user characteristics. DVR 143 connects and subscribes to the resource manager 120 to receive resource notifications. Near recording start time, whether it is X minutes (X is configurable by the DVR 143) or immediately before a recording starts (for impulse recordings), the DVR 143 must communicate with the resource manager 120 to request resource for a recording to start. The resource manager 120 determines whether ABR pulled segments can be allocated based on a number of rules. The resource manager 120 then broadcasts the list of active pulling of ABR segments and terminated pulled ABR segments to all connected UX platform 150 clients and the DVR 143. The UX platform 150 may present the information to the user as needed. In case of resource conflict, the user may choose to end some conflicting ABR pulled segments to manually resolve the conflict. If a recording cannot be started due to conflict constraints, the DVR. 143 reports the blocked (or failed?) status back to the scheduler service 160. For any events that cause resource changes, which include recording starts/stops/fails, the DVR 143 must report such events to the resource manager 120. The resource manager 120 will update the resource statuses accordingly. The resource manager 120 broadcasts the list of ABR pulled segments including active pulling of ABR segments and terminated/stopped/blocked pulled ABR segments to all connected UX platform 150 clients and DVR 143. The DVR 143 must process such notifications and take actions when necessary.

Referring to FIG. 2, the scheduler service 160 is utilized by the system when the user scheduling that may be comprised as a scheduler API and a schedule dB. The scheduler service 160 is utilized to create an event such as an impulse recording (e.g. record now) or a future recording of media content. The user utilizes the scheduler service 160 to specific DVR settings and preferences default DVR scheduling settings (offset, delete priority, recording priority, series, etc.) and other user privileges. The scheduler service 160 checks with the gatekeeper 155 for authentication, entitlement check, and other account data for the particular user.

In an exemplary embodiment, as is illustrated in FIGS. 1-2, a user has a device 140 which has may have application software 141 loaded in memory of the device 140, e.g. a set-top box or satellite DVR receiver. In establishing a recording, the device 140 checks with the gatekeeper module 188 to determine the users privileges, the user's metadata, the lineup data, performs a restrictions check such as passing an authorization token, and also may be used to purchase media content. The application software 141 may be configured as application programming interfaces (API). The application software 141 may be configured with a browser 142, a digital video recorder (DVR) 143, authorization token or restriction checker 144, a digital rights management (DRM) module 145, and content media player 146. The application software 141 is adapted to login to a gatekeeper 155 module of the resource manager 120. The gatekeeper 155 also utilizes APIs for various the subscribers' data services for policies of acquisition, persistence, and consumption for the media content that may be established by the back office 130. The gatekeeper 155 can be used in recording linear 102 and non-linear 103 media content including a lineup API 156, login API 157, playback API 158 and purchase API 159.

Similarly, when a user utilizes the DVR function such as "pause" or "record" the DVR function is managed by the resource manager 120. The resource manager 120 may be configured to operate on requests to pull ABR segments based on address information stored in by the resource manager about the desired one or more media content segments as is illustrated in FIG. 3. The user provides a request for available stored content media 102, 103 such as, for example, based on the manifest file, media content data or database 123 or other information from the users account. The resource manager 120 may be configured to manage bandwidth resources, policies, and applicable number of rules of the user account such as by the content management 122 and token restriction check 144. The user's DVR function input is transmitted to the scheduler service 160 from the user device 140 as shown in FIGS. 1 and 2. The scheduler service 160 determines from the resource manager 120 and CDN 105 the identity of the media content 102, 103 and its location from various sources including the manifest files on the content management system 122, the media content data 123 stored across the CDN servers, (e.g. in the origin server or $1^{st}$ tier cache, mid-tier cache, edge-cache information) from a catalog 126, and other information.

One or more user characteristics about the user are stored on the resource manager the resource manager 120, on the user device 140, or both. The ABR segment pull system and method 100 of delivery of the media content 102, 103 is available based on the one or more user characteristics. If delivery of media content 102, 103 is not available, the scheduler service 160 begins the recording and storage of the desired media content 102, 103. If the delivery of media content 102, 103 is available, the resource manager 120 identifies the file information of the specific media content data 102, 103. The scheduler service 120 schedules the delivery of the media data content 102, 103 on-demand or at a predetermined time requested by the user. At the predetermined time being reached, the resource manager 120 delivers the paused or recorded requested media content data 102, 103 to storage of the on the device 140 (i.e. storage 147 or in network storage 123) and the resource manager 120. Once all frames of the desired media content 102, 103 are delivered according to the user's request, the delayed DVR system and method 100 (i.e. the process 200) terminates or ends whereby the user has the content 102, 103 for playback.

As shown in FIG. 1, the UX platform 150 may be implemented by an API that connects and subscribes to the resource manager 120 to receive resource notifications. For any DVR function for recording media content 102, 103 for playback later, the UX platform 150 communicates with the resource manager 120 to request pulling ABR segments of the media content 102, 103. The resource manager 120 can be configured to determine whether a stream may be allocated based the resources, policies, and applicable number of rules such as by the content management 122 and token restriction check 144. The resource manager 120 then broadcasts the list of pulled ABR segments with their latest statuses to all connected devices 140 to UX platform 150 of clients and to the DVR 143 function. The UX platform 150 may present the information to the device 140 of a user as needed to resolve resource conflicts such as, for example, the user may choose to end some conflicting pulled ABR segments to manually resolve the conflict. The resource manager 120 broadcasts the list of ABR segments including active pulling of ABR segments and terminated/stopped/ blocked pulled ABR segments to all connected UX platform 150 clients and Recorder. The UX platform 150 must process such notifications and take actions when necessary. For any user actions that cause bandwidth resource changes, which include a pull ABR segments from storage starts and stops, the UX platform 150 must report such events to the resource manager 120. The resource manager 120 will update the resource statuses accordingly.

For example, when the user tunes to a particular linear channel (or flipping through channels), the UX platform 150 requests linear content 102 from the resource manager 120, the resource manager will begin to pull ABR segments from storage available on the CDN by referencing the manifest file, catalog, file information, etc. If the user navigates away from viewing linear TV the resource manager 120 will stop pulling ABR segments to send to the device 140. Once the user starts viewing a channel, the UX platform 150 may be configured to report profile changes (such as registering 4K display device in the profile) to the resource manager 140 for further video control 122 of the available bandwidth and ABR resource management. Each Mosaic tile is pulled ABR segments from storage available on the CDN displayed on that view. Bandwidth management is improved as policies, rules and assumptions may be implemented, for example, pulling pull ABR segments from storage available on the CDN based on the assumption that all tiles on the Mosaic view together would utilize about the same bandwidth. When a user requests to view a video in full screen from a Mosaic view tile, UX terminates the tile view of pulled ABR segments and requests a new pull of ABR segments from storage available on the CDN for the full screen video with the corresponding view and resolution. Any further pulled ABR segments displayed in the Mosaic view will still be considered as an ongoing pull ABR segments for bandwidth, policy and management functions. That is, if a user goes back to the Mosaic view from playing a video (or an ongoing DVR recording is displayed in the Mosaic view), the video still consumes utilization of pull ABR segments from storage available on the CDN until it gets stopped by the user.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device, comprising:
    a non-transitory storage medium that stores instructions; and
    a processing unit that executes the instructions to:
        receive a digital video recording request for content from a content delivery network;
        monitor at least processing and storage capacity to select a bandwidth;
        locate segments for the content having a bit rate corresponding to the bandwidth in the content delivery network from multiple versions of the content that each have different bit rates;
        begin pulling the segments for the content to fulfill the digital video recording request;
        determine whether to delay fulfillment of the digital video recording request based on user characteristics to reduce system overhead despite being able to fulfill the digital video recording request without cancelling or rescheduling another digital video recording request; and
        if the processing unit determines to delay fulfillment of the digital video recording request, delay pulling of the segments for the content.

2. The electronic device of claim 1, wherein the processing unit:
    selects an updated bandwidth based on an updated monitoring of the storage capacity; and
    pulls additional segments having an additional bit rate based on the updated bandwidth.

3. The electronic device of claim 2, wherein the processing unit plays the segments and the additional segments in response to the digital video recording request.

4. The electronic device of claim 1, wherein the electronic device comprises a content player.

5. The electronic device of claim 1, wherein the content comprises at least one of linear content or non-linear content.

6. The electronic device of claim 1, wherein the segments are between approximately 2 and 10 seconds in duration.

7. The electronic device of claim 1, wherein the multiple versions of the content each have a different video quality.

8. A method for obtaining content from a content delivery network, comprising:
    receiving a digital video recording request for content from the content delivery network at a device;
    selecting a bandwidth based on monitored device resources;
    determining locations in the content delivery network of segments for the content that have a bit rate corresponding to the bandwidth, the content delivery network storing multiple versions of the content, each of the multiple versions of the content having different bit rates;
    delaying fulfillment of the digital video recording request based on user characteristics to reduce system overhead despite being able to fulfill the digital video recording request without cancelling or rescheduling another digital video recording request; and
    pulling the segments for the content from the locations to the device to fulfill the digital video recording request.

9. The method of claim 8, wherein pulling the segments for the content uses a hypertext transfer protocol get request.

10. The method of claim 8, wherein pulling the segments for the content time shifts the content.

11. The method of claim 8, further comprising assembling the segments, utilizing the device, to create a temporal viewing experience.

12. The method of claim 8, further comprising:
    determining to change to an additional bandwidth based on a change in the monitored device resources; and
    switching to additional segments for the content having a different bit rate than the segments.

13. The method of claim 12, further comprising assembling the segments and the additional segments into an original order.

14. The method of claim 8, wherein selecting the bandwidth further comprises selecting the bandwidth based on a network speed.

15. A content delivery system, comprising:
    a communication network; and
    at least one device communicably connected to a digital video recorder device via the communication network, the at least one device:
        stores multiple versions of content that each has different bit rates;
        delays fulfillment of a digital video recording request based on user characteristics to reduce system overhead despite being able to fulfill the digital video recording request without cancelling or rescheduling another digital video recording request, the digital video recording request corresponding to the content; and
        provides segments for the content, the segments having a bit rate corresponding to a bandwidth selected by the digital video recorder device based on monitored digital video recorder device resources, in response to a pull by the digital video recorder device initiated to satisfy the digital video recording request.

16. The content delivery system of claim 15, wherein the at least one device receives a request to cancel the pull in response to transmitting an indication of a pull conflict to the digital video recorder device.

17. The content delivery system of claim 15, wherein the digital video recording request specifies a later time for the pull.

18. The content delivery system of claim 15, wherein the at least one device provides segments for the content at a predetermined time specified by a user of the digital video recorder device.

19. The content delivery system of claim 15, wherein the at least one device maintains a manifest indicating locations of the multiple versions of the content.

20. The content delivery system of claim 15, wherein the at least one device encodes the multiple versions of the content.

\* \* \* \* \*